Feb. 16, 1954   R. TURK   2,669,492
JOURNAL BEARING, IN PARTICULAR FOR AXLES OF ROLLING STOCK
Filed March 26, 1952
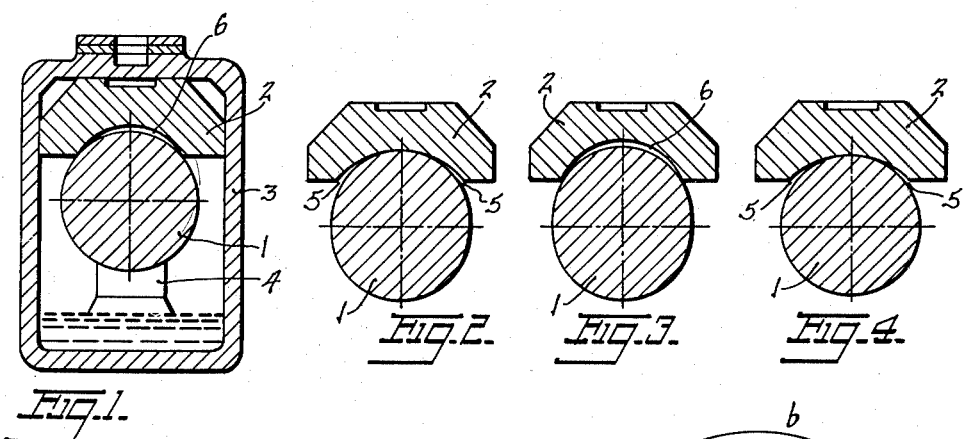
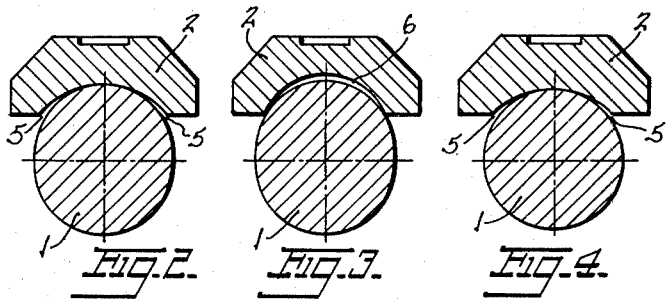
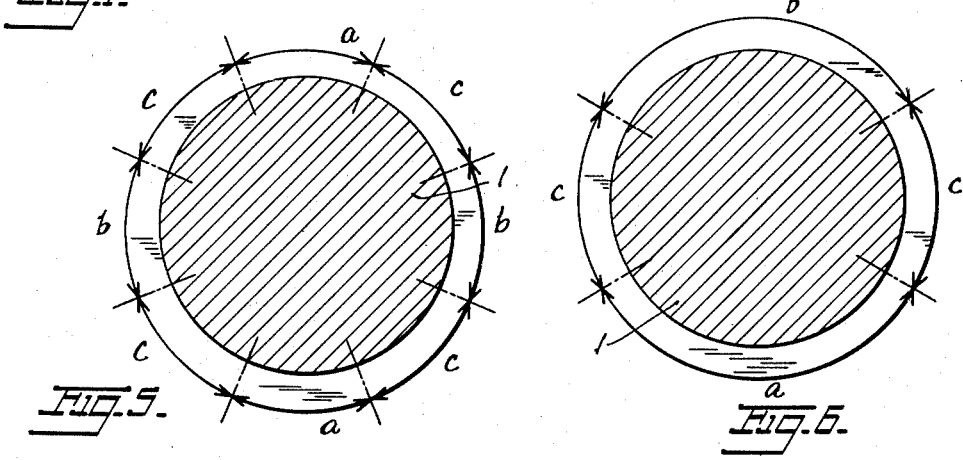
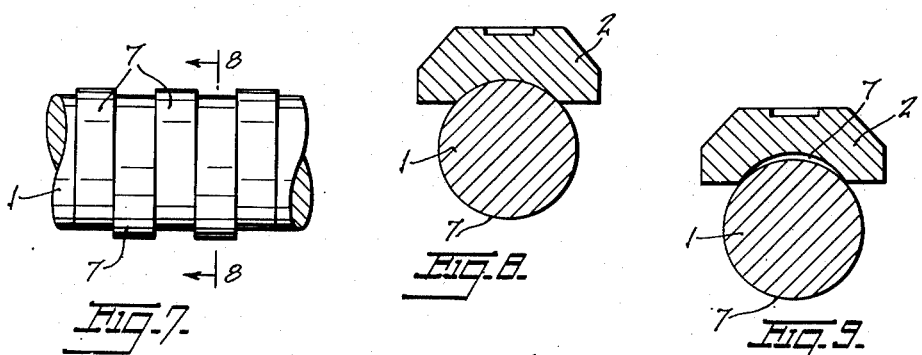
INVENTOR.
ROBERT TURK
BY
ATTORNEY Patented Feb. 16, 1954

2,669,492

UNITED STATES PATENT OFFICE 2,669,492

JOURNAL BEARING, IN PARTICULAR FOR AXLES OF ROLLING STOCK

Robert Turk, Gars am Kamp, Austria

Application March 26, 1952, Serial No. 278,693

5 Claims. (Cl. 308—79)

The invention relates to a journal bearing, intended in particular for axles of rolling stock, and comprising a movable bearing bush and means to apply lubricating oil on the rotating journal surface. Practice has shown that in spite of numerous designs the running time of these bearings is still insufficient and that a high percentage of them tends to run hot. All existing bearings are based on the idea of maintaining between the bearing surfaces a film of lubricant providing for minimum friction in operation. It has been found that in heavily loaded axle bearings of rolling stock the bearing bushes, even where the bearing surface is machined most carefully, often do not stand even through a single inspection period and exhibit surface abrasion from one inspection to the next. This drawback is not due to defects of material but to the fact that the bearing surface of the bearing bush rests on the journal under the loading pressure of the car always at nearly the same point, at the apex of the arc. For this reason it is most heavily stressed frictionally by the rotating journal at this point. By the constant pressure of the bearing bush on the rotating journal at the apex of the bearing surface of the bearing bush, excessive heat tends to be generated in spite of lubrication. Thereby the effect of the lubricant is partly reduced so that the bearing surface of the bearing bush is gradually abraded, beginning from the apex, in both circumferential directions. As the width of the abraded bearing surface of the bearing bush increases, it will offer a greater resistance to the passage of the lubricating film of the journal, and the abrasion of the bearing surface of the bearing bush will continue at a higher rate. In many cases this abrasive process proceeds with such acceleration that a bearing exhibits hot-running tendencies within one inspection interval.

The invention is based on the idea to remove this drawback by the utilization of the known lubricating wedge, which is formed by the admission of an oil cushion of crescent-shaped cross section between the bearing surfaces of the journal and of the bearing bush, in order to supply lubricating oil to all parts of the bearing surface of the bearing bush.

In accordance with the invention this idea is realized in that the journal generally being formed in accordance with a cylindrical surface has at least one elevation which protrudes over said cylindrical surface, preferably by between a hundredth of a millimeter and two tenths of a millimeter, and merges steplessly with said cylindrical surface in the peripheral direction, said elevation occupying in the axial direction at least part of the length of the journal. In accordance with the above the journal may be of elliptic cross section or of cam-shaped cross section or have several parts of circular cross section which are axially staggered from each other and are eccentric to the shaft center, the radius of curvature of the bearing surface of the bearing bush in the cross-sectional plane approximating the mean radius of curvature of the cross section of the journal so that the bearing surface of the rotating journal contacts the bearing bush at continually changing points. Thereby at least once during each turn of the journal the film of lubricant is enlarged in the shape of a wedge between the bearing surfaces of the journal and the bearing bush. By means of the film of lubricant of the journal, a bearing of that type will supply lubricating oil continually to the various points in the bearing surface and will thus prevent, without forced lubrication, the formation of friction surface parts from which the lubricating film has been removed.

This problem may be solved in various ways, the most essential of which will be dealt with by reference to the embodiments to be described hereinafter.

Figs. 1 and 2 are cross-sectional views of an axle bearing for rolling stock, having an elliptic journal, in two different positions of rotation.

Figs. 3 and 4 are cross-sectional views of a journal of cam-shaped cross section, in conjunction with a bearing bush, in two different positions of rotation.

Figs. 5 and 6 illustrate the proportions of the partial surfaces of the periphery of the journal, which partial surfaces correspond to the small and large arcs of the ellipse, in the case of a journal of elliptic and cam-shaped cross-sections, respectively.

Figs. 7, 8, 9, and 10 are cross-sectional and longitudinal sectional views showing a journal with bearing surfaces staggered by 90 deg., and the bearing bush, in three different angular positions of rotation of the journal.

One of the fundamental solutions provided by the invention is shown in Figs. 1 and 2. This may concern, e. g., a journal 1 of a wheel axle, and the bearing bush 2 of a journal box 3 of a railroad car. The drawing shows exaggeratedly that the journal 1 is of elliptical cross-sectional shape, the radii of curvature of the large and small arcs of the ellipse differing only very slightly, e. g., by tenths of a millimeter. It may be assumed that the large diameter of the journal be 115 mm., and the small diameter 114.8 mm. The radius of curvature of the bearing surfaces of the bearing bush is dimensioned so as to lie between the radii of the large and small arcs of the ellipse. In this case the radius of the bearing surface of the bearing bush may correspond to a diameter of 114.9 mm. As the journal is rotating, it is provided all over its surface with lubricating oil by any known means, e. g., a lubricating pad 4, so that this surface is provided with a film of lubricant. In the position shown in Fig. 2, the journal 1 provided with the film of lubricant offers to the bearing surface of the bearing bush 2 as a support the small arc $a$ so that in this position of rotation of the journal both bearing surfaces contact only at the center of the cross section whereas at the longitudinal edges of the bearing surface of the bearing bush 2 there is a clearance of hundredths of a millimeter, in which clearance a so-called lubricating wedge may form. As the journal 1 turns out of the position shown in Fig. 2 into the position of rotation shown in Fig. 1, the relationship of the contacting surfaces of the journal 1 and of the bearing bush 2 is basically changed. As the partial surface $a$ of the small arc is replaced by the partial surface $b$ of the large arc of the elliptic cross section of the journal, the supporting zone of the journal travels from the center towards both margins of the bearing surface of the bearing bush so that in the center of the cross section a crescent-shaped chamber 6 is formed, which has a depth of hundredths of a millimeter. By the supporting pressure of the bearing bush and the rotation of the journal the lubricating oil is forced into said chamber. Thus a cushion 6 of oil under pressure forms automatically between the two bearing surfaces of the journal 1 and the bearing bush 2. As the journal is rotating this cushion will wipe over all surface parts of the bearing surface of the bearing bush and will thus provide for the necessary coverage with lubricant at all points of the bearing surface. These wedges of lubricant 5 and this cushion of lubricant 6 forming twice during each turn of the journal of elliptic cross section, adequate lubrication of the bearing surface of the bearing bush is ensured and the aim is achieved to avoid dry bearing surface parts free from lubricant.

Fig. 5 clearly shows that the peripheral surface of an elliptic journal is divided in the peripheral direction into eight partial surfaces of different radii of curvature, of which the four partial surfaces $c$ are curved almost cylindrically whereas the two partial surfaces $a$ of the small arcs of the elliptic cross section have a smaller radius of curvature and the partial surfaces $b$ of the large arcs of the elliptic cross section have a larger radius of curvature than the partial surfaces $c$. In accordance with their order these partial surfaces successively wipe over the bearing surface of the bearing bush during the rotation of the journal. If instead of an elliptic cross section the journal 1 has a cam-shaped cross section as shown in Figs. 3 and 4, the rolling contact of the partial surfaces $a$, $b$, and $c$ of the journal 1 with the bearing surface of the bearing bush 2 will take place in another order. The journal of this cross-sectional shape is also based on the circular cross section, of which the two partial surfaces $c$ (Fig. 6), belonging to the circumference of the circle, remain. These partial surfaces $c$ separate a partial surface $a$, the radial distance of which from the axis exceeds the radius of the circle and which has a smaller radius of curvature than the circle, from a partial surface $b$ the radial distance of which from the axis is larger than the radius of the circle and which has a larger radius of curvature than the circle. Together with the surface of the bearing bush the partial surface $b$ defines a cavity 6 having the cross-sectional shape of a crescent. As the journal 1 is rotating the cam-shaped elevation $a$ will lift, in the phase of rotation shown in Fig. 4, the bearing bush 2 from the journal to such an extent that a wedge of lubricant 5 is formed before and behind the elevated part $a$ of the cam. As the journal continues to rotate, this wedge is used to lubricate the partial surfaces $c$. As one of the partial surfaces $c$ wipes over the bearing surface of the bearing bush, another lubricating wedge is formed adjacent to them in the range of the partial surface $b$. In the moment when the partial surface $b$ of the journal is opposite to the bearing surface of the bearing bush, both partial surfaces $c$ adjoin the bearing surface of the bearing bush and force the film of lubricant into the crescent shaped chamber 6 formed between the journal and the bearing surface of the bearing bush. Thus the lubricating oil is free to distribute all over the bearing surface.

In the embodiment shown in Figs. 7, 8, 9, and 10, the problem set forth is solved thereby that the journal 1 has several eccentric surfaces 7 arranged axially one beside the other and having their apexes peripherally staggered by 180 deg. To characterize the eccentricity, it is exaggerated in the drawings, the actual eccentricity amounting only to hundredths of a millimeter. As the journal is rotating the eccentric surfaces 7, by lifting and lowering the bearing surface of the bearing bush, successively supply wedges or cushions of lubricant to these bearing surfaces to provide for a thorough lubrication of the whole bearing surface of the bearing bush.

I claim:

1. An axle bearing comprising a journal box, a bearing bushing mounted in said box, said bushing having an arcuate lower surface, and a journal rotatably extended into said journal box, the outer perimeter of said journal engaging the arcuate surface of said bushing, said journal being non-circular in shape to provide clearance between the arcuate lubricating surfaces of the bushing and journal, said journal is elliptical in cross-section.

2. An axle bearing comprising a journal box, a bearing bushing mounted in said box, said bushing having an arcuate lower surface, and a journal rotatably extended into said journal box, the outer perimeter of said journal engaging the arcuate surface of said bushing, said journal being non-circular in shape to provide clearance between the arcuate lubricating surfaces of the bushing and journal, said journal is cam-shaped in cross-section.

3. An axle bearing comprising a journal box, a bearing bushing mounted in said box, said bushing having an arcuate lower surface, and a journal rotatably extended into said journal box, the outer perimeter of said journal engaging the arcuate surface of said bushing, said journal being non-circular in shape to provide clearance between the arcuate lubricating surfaces of the bushing and journal, said journal includes eccentric surfaces.

4. The combination of claim 3 wherein said eccentric surfaces are staggered in relation to each other.

5. The combination of claim 4 wherein said staggered eccentric surfaces are axially arranged and their apexes are peripherally staggered by 180 degrees.

ROBERT TURK.

References Cited in the file of this patent

FOREIGN PATENTS

| Number | Country | Date |
|--------|---------|------|
| 611,401 | Germany | Mar. 27, 1935 |